Jan. 1, 1952   R. A. BRASWELL   2,580,398
DRILL PRESS
Filed Nov. 17, 1949   3 Sheets-Sheet 1
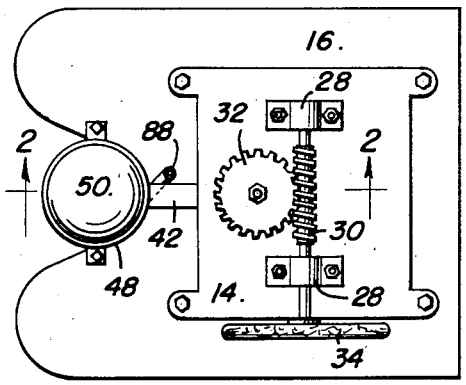
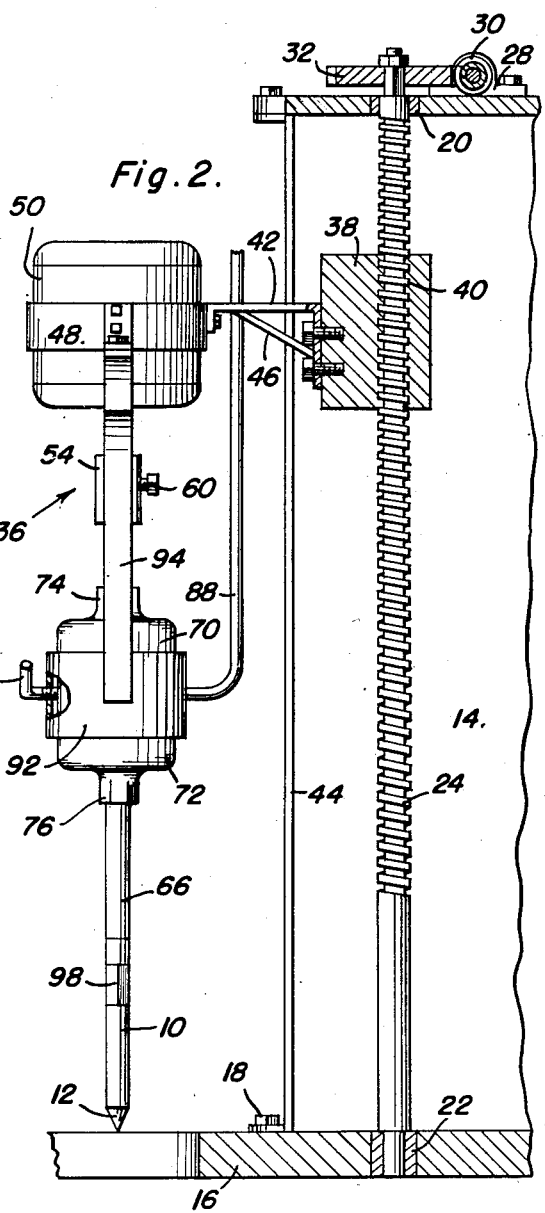
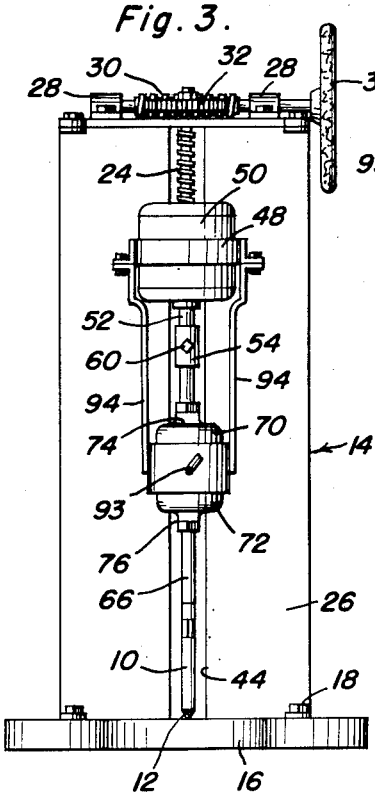
Roy A. Braswell
INVENTOR.

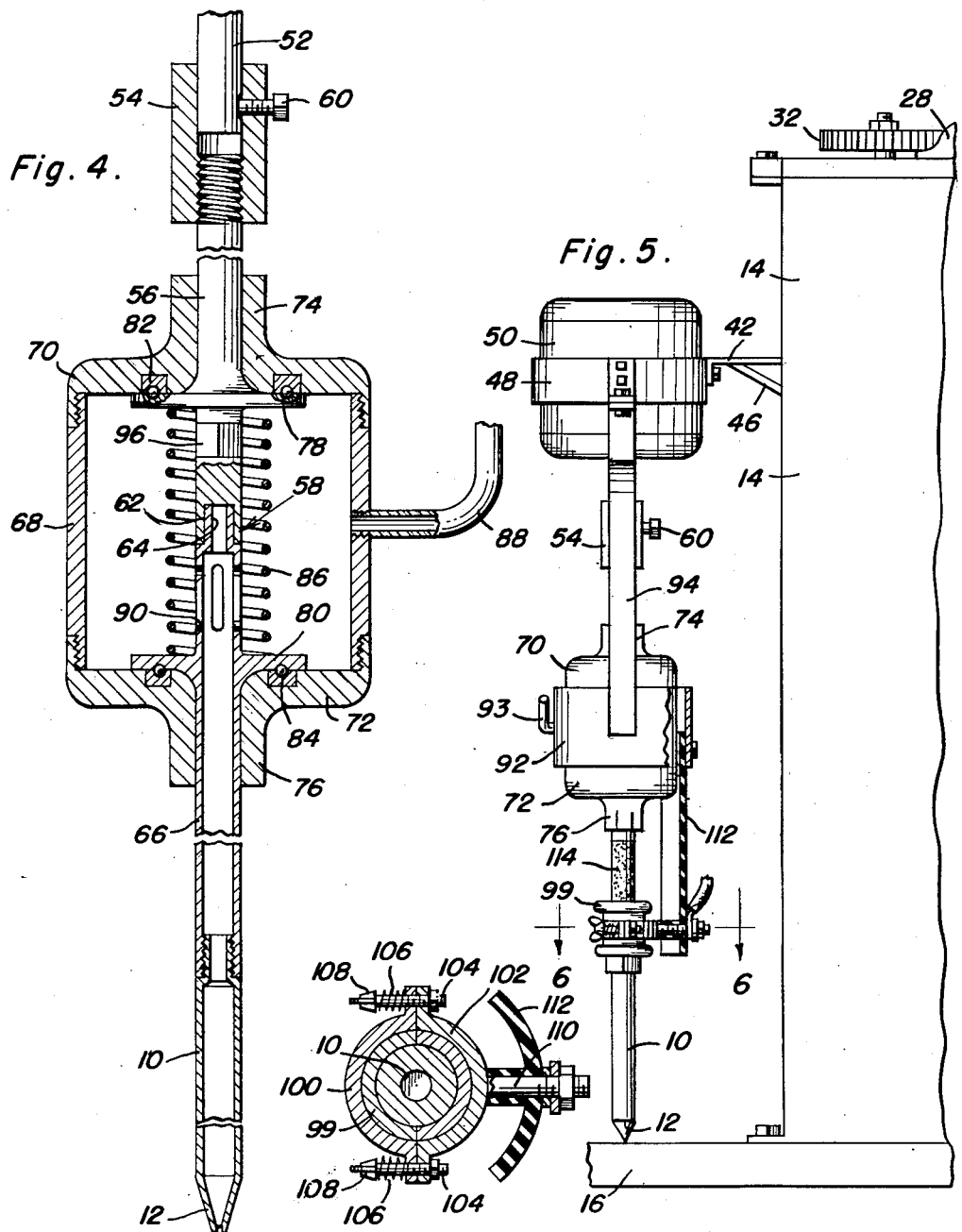

Jan. 1, 1952     R. A. BRASWELL     2,580,398
DRILL PRESS

Filed Nov. 17, 1949     3 Sheets-Sheet 3

Roy A. Braswell
INVENTOR.

BY *Clarence A. O'Brien*
*and Harvey B. Jacobson*
Attorneys

Patented Jan. 1, 1952

2,580,398

UNITED STATES PATENT OFFICE 2,580,398

DRILL PRESS

Roy A. Braswell, Alderson, Okla.

Application November 17, 1949, Serial No. 127,925

8 Claims. (Cl. 266—23)

1

This invention relates to new and useful improvements in drill presses and the primary object of the present invention is to provide a hollow, open ended, rotary bit through which a gas is directed, the gas being ignited at the tip of the bit to permit the bit to pass through work in a minimum time.

Another important object of the present invention is to provide a bit of the aforementioned character and a traveling holder for the bit that will move at a predetermined speed toward the article being worked.

Yet another object of the present invention is to provide a drill press including a hollow, open ended, bit through which a gas is directed to be ignited at the top of the bit, the bit being rotated at high speed to effect a whirling of the gas discharged from the bit to permit the bit to drill a hole in metal similar to an acetylene cutting torch and since the bit is rotating the hole formed will be free of clinging fragments.

Another object of the present invention is to provide a bit that is constructed to function as the tip on a gas burning torch and which bit is also energized by electric means when an arc is struck to further reduce the normal time required for cutting or drilling metal.

A further object of the present invention is to provide an apparatus for drilling holes and which is adaptable, with slight modifications, for both arc and acetylene cutting.

A still further aim of the present invention is to provide a drill press that is simple and practical in construction, strong and reliable in use, neat and attractive in appearance, highly efficient and durable in operation, relatively inexpensive to manufacture and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the present invention;

Figure 2 is an enlarged, longitudinal vertical sectional view taken substantially on the plane of section line 2—2 of Figure 1;

Figure 3 is an elevational view of Figure 1;

Figure 4 is an enlarged, longitudinal vertical sectional view showing the hollow bit and bit holder;

Figure 5 is an elevational view, similar to Figure 2, and showing an electrical means for energizing the rotary bit when an arc is struck to perform the drilling;

Figure 6 is an enlarged, transverse horizontal sectional view taken substantially on the plane of section line 6—6 of Figure 5;

Figure 7:
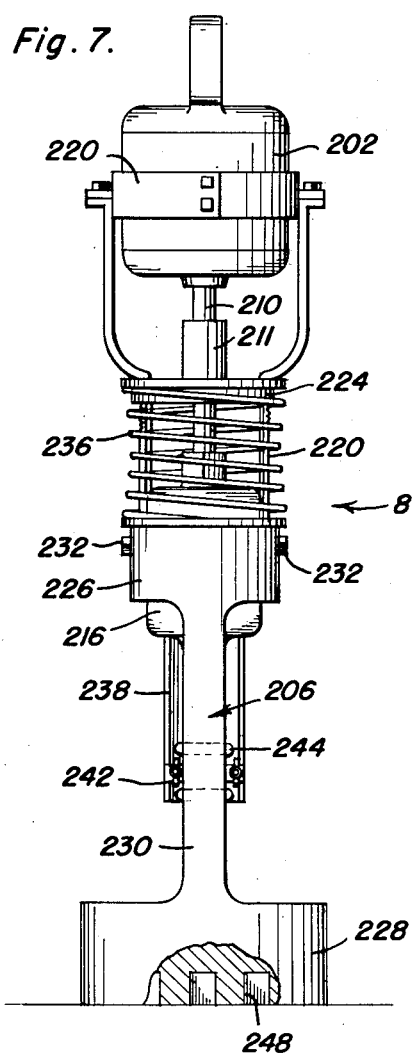
Figure 7 is an elevational view of the present invention in modified form.

Referring now to the drawings in detail, and more particularly to Figures 1–6 inclusive, wherein for the purpose of illustration, there is disclosed one embodiment of the present invention. The instant structure anticipates the use of an elongated hollow, open ended, bit 10 having a tapered tip 12. The bit 10 is rotated at high speed and is moved longitudinally toward an article being worked. Gas is directed through the bit and ignited at the tip 12 so that the apparatus will function as a rotatable and movable metal cutting torch.

In addition to the gas operable function of the instant metal working machine, there is also provided a means whereby the bit 10, or a similar bit, may be heated electrically. Therefore, the present machine contemplates the use of either or both gas and electricity for creating the heat required for cutting or drilling metal.

Figures 1–4 inclusive deal with the present metal working machine assembled for use with gas and this specific construction will first be described in detail from whence a description of the electrical heating means of Figures 5 and 6 will follow together with a discussion of the machine assembled for utilizing both gas and electricity.

A housing 14 is detachably secured to and rises from a suitable base 16 through the medium of fasteners or bolts 18. Upper and lower bearings 20 and 22, mounted on the respective upper and lower walls of the housing 14 receive the reduced end portions of a threaded shaft or worm 24 that is spaced parallel to one side wall 26 of the housing 14.

Journaled for rotation in bearings 28 on the upper wall of the housing 14, is a threaded drive shaft or worm 30 that engages a gear 32 on the upper end of the shaft 24. The shaft 30 is manually rotated by a hand wheel 34 at one end of the shaft 30.

A tool holder 36 is associated with the housing 14 and more particularly the shaft 24. The tool holder includes a traveling member or block 38 having an internally threaded bore 40 that receivably engages the shaft 24. One leg portion of an angle member or bracket 42 is removably secured to one face of the block 38 and the other leg portion of the bracket 42 is slidably received in a vertical slot 44 formed in the wall 26.

The leg portions of the bracket 42 are connected and braced by an arm 46 and a belly band or strap 48 is secured to the bracket 42 exteriorly of the housing 14. The band 48 embraces a motor 50 having a depending drive shaft 52 that is coupled by a sleeve or collar 54 to the upper section 56 of a sectional bit holding member 58. The collar 54 receives the lower end of the shaft 52 and is held against rotation relative to the shaft 52 by a set screw 60 as shown in Figure 4. The lower end of the collar 54 is internally threaded to receivably engage the upper externally threaded end of the section 56.

The lower end of the section 56 is provided with a recess or depression 62 that receives the upper reduced end portion 64 of the lower section 66 of the member 58. The joined ends of the sections 56 and 66 are received within a housing or casing 68 having removable upper and lower walls 70 and 72. Upper and lower sleeves 74 and 76, integrally formed with the walls 70 and 72, respectively, journally receive the sections 56 and 66.

Flanges 78 and 80 are provided on the sections 56 and 66, respectively, and rest against suitable bearing races 82 and 84 mounted on the walls 70 and 72. The flanges 78 and 80 are positioned within the casing 68 and are urged against bearing races 82 and 84 by a coil spring 86 that embraces the adjacent ends of the sections 56 and 66 and which is biased between the flanges 78 and 80 to permit the sections 56 and 66 to rotate as a unitary structure relative to the casing 68.

A gas delivery conduit 88 leading from a source of gas, such as the gas used in acetylene torches, is connected to the casing 68. The section 66 is tubular and includes slots 90 adjacent its reduced end 64 so that gas entering the casing 68 will exit through the section 66 and the bit 10 that is threaded to the lower end of the section 66.

A strap 92 is disposed about and held on the casing 68 by any suitable means, such as set screw 93, and this strap 92, is secured to hanger arms 94 depending from the motor embracing band 48.

In practical use of the present invention thus described, gas is fed into the casing 68 and through the section 66 and bit 10 as the tool holder 36 is lowered by a rotation of the shaft 24.

The gas is ignited at the tip 12 and the bit 10 is rotated by the drive shaft 52 of motor 50 to effectively and rapidly cut metal or drill metal supported upon the base 16.

Obviously, suitable packing glands may be associated with the sleeves 74 and 76 as well as the parts of the casing 68 in order to prevent the seepage of gas from the casing other than through the section 66.

The section 56 is provided with a multi-sided portion 96 and the bit 10 is also provided with a multi-sided portion 98 that will permit a wrench or the like to be employed during securing of the section 56 to the collar and the bit 10 to the section 66.

When the bit 10, or a suitable bit, is to be heated by electrical means, as shown in Figures 5 and 6, a conductive member 99 surrounds the upper end of bit 10 and is embraced by a clamp having similar halves 100 and 102. The halves 100 and 102 are slidably joined by bolts 104 and springs 106 embracing the bolts 104 and biased between abutments 108 on the bolts and one of the halves 100 yieldingly urges the halves together to clampingly grip the member 99.

A further bolt or arm 110 projects laterally from the half 102 and is connected to the strap 92 by a non-conductive plate 112. A non-conductive connector 114 between the bit 10 and section 66 is also provided.

In practical use of the present invention described in Figures 5 and 6, the bolt 110 is connected to either a ground line of a "hot" line and the article being worked is connected to either a "hot" line or a ground line (depending on the line used with bolt 110), it being understood that the bit 10 is of a suitable heat retaining material such as carbon, tungsten, Nichrome, or platinum.

It is thus observed that as the bit is rotated to drill or cut the same will be heated to reduce the normal time required for drilling or cutting metal.

Since it is possible to both ignite the gas leaving the tip 12 of the bit and also heat the bit, both of these features can be simultaneously employed to produce the end result of cutting or drilling metal though in some instances it may be necessary to use a conductive element to bridge the gap between the work and the bit.

Figure 8:
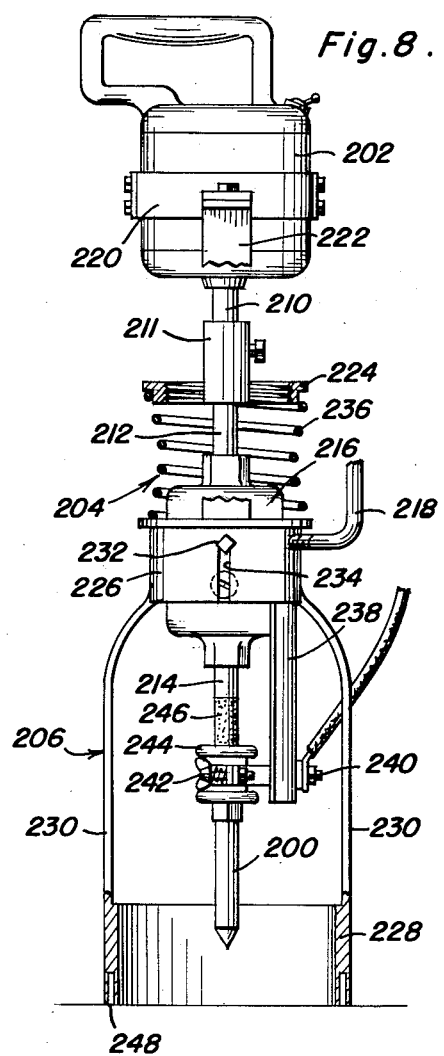
Figure 8 is a view taken substantially in the direction of arrow numbered 8 in Figure 7, and with parts broken away for the convenience of explanation; and, Figure 9 is a detail perspective view showing an alternative method for energizing the rotary bit by electric means.

Reference is directed to Figures 7 and 8 wherein there is disclosed a portable metal working machine patterned after the machine previously described since it employs a hollow bit 200, a means 202 for rotating the bit, a holder 204 for the bit and a support 206 slidably receiving the holder 204.

The bit rotating means 202 is a motor 208 having a depending drive shaft 210 that is coupled by a collar 211 to the upper end of an upper bit holding member section 212. The section 212 is connected to the upper end of a lower bit holding member section 214 for rotation therewith and the adjacent ends of the sections 212 and 214 are positioned in a casing 216 that is connected to a source of gas by a conduit 218.

A band 220 embraces the motor 202 and arms 222 depending from the band 220 support a ring 224 that is threaded on the arms 222. The support 206 consists of upper and lower circular members 226 and 228 that are joined by connecting strips 230.

Lugs 232 project laterally from the casing 216 and are slidably received in vertical slots 234 provided in the member 226. A coil spring 236 embraces the casing 216 and the upper section 212 and this spring is biased between the upper member 226 and the ring 224 to yieldingly support the motor 202, casing 216 and bit 200 raised relative to the support 206 so that pressure will be required to move the bit 202 toward the article being worked.

A non-conductive strip 238 is suitably secured to lower ends of the arms 222 and is also secured to a bolt 240 projecting from a clamp 242 that embraces a conductive collar 244 on the bit 200.

The operation of this apparatus, as described in Figures 7 and 8, is similar to that described in Figures 1–6 inclusive and may be used with gas, electricity or both with the bolt 240 and the article being worked connected to the positive and negative poles of a welding machine.

The lower edge of the member 228 is provided with a plurality of circumferentially spaced recesses that receive magnets 248 tending to retain the member 228 relative to metal while drilling to thereby aid the stability of the apparatus.

Figure 9:
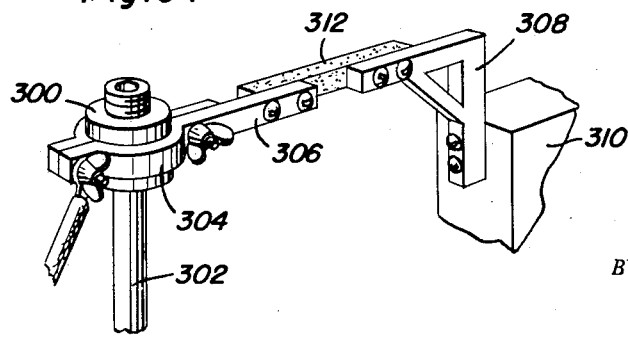

Figure 9 shows a collar 300 on the upper end of the hollow bit 302 and a clamp 304 about the collar 300. An arm 306 extending from the clamp 304 is connected to a bracket 308 on a supporting structural element 310 by a non-conductive strip 312. This latest construction is utilized when the bit is held relatively stationary and the work is to be fed thereto. The work and the bit are connected to an electric means of opposite polarity such as the poles of a welding machine.

By replacing the bit 10 with a welding rod of proper construction, the instant machine can be used to weld electrically and spot weld and braze. The portable model may also be used in the same manner and by replacing the bit 302, in Figure 9, with a welding rod it may also be used for welding, spot welding and brazing by means of elevation and depression of hand wheel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A machine for making holes in metal, said machine comprising a motor mounting, means operatively connected to said mounting for selectively raising and lowering the latter, hanger straps depending from the mounting, a sleeve carried by said straps, a housing member embraced by said sleeve and having an inlet port, a pair of shafts connected together for unitary rotation and extending through the member, one of said shafts being hollow and having openings therein to receive gas passing into the housing member, a motor supported by said mounting and operatively connected to said shafts, and a resilient connection between said shafts.

2. The combination of claim 1 wherein said shafts include inner adjacent ends positioned in said housing member, a flange on each shaft and positioned in said housing member, said resilient connection including a spring within said housing member embracing said adjacent ends of said shafts and biased between said flanges.

3. The combination of claim 2 wherein said housing member includes upper and lower walls, an upper ball race supported by said upper wall and within said housing member and a lower ball race supported by said lower wall and within said housing member, said spring urging said flanges against said ball races.

4. The combination of claim 1 having a hollow bit carried by said hollow shaft and communicating with the interior of the latter and an electrical means for heating said bit, said heating means consisting of a conductive clamping member clamped about said bit, and a hanger depending from said sleeve and supporting said clamping member.

5. A machine for making holes in metal, said machine comprising a motor mounting, means operatively connected to said mounting for selectively raising and lowering the latter, hanger straps depending from the mounting, a sleeve carried by said straps, a housing member held within said sleeve, upper and lower coaxial shafts having adjacent ends extending into said housing member, a resilient connection between said shafts and disposed within the housing member, a motor supported by said mounting and operatively connected to said upper shaft, a bit carried by the lower shaft, and means operatively connected to said bit for heating the latter.

6. In a drilling machine including a driving shaft, a bit holder comprising a housing member having first and second end walls, a first driven shaft coupled to said driving shaft and extending through the first end wall of said member, a second driven shaft extending through the second end wall of said member, means centering said second driven shaft with respect to said first driven shaft, a first flange on the first driven shaft and positioned in said member, a second flange on said second driven shaft and also positioned in said member, anti-friction means between said first flange and the first end wall of said member, additional anti-friction means between said second flange and said second end wall, and a spring within said member and embracing said driven shafts and biased between said flanges to yieldingly urge the flanges away from each other.

7. The combination of claim 6 wherein said second driven shaft includes an axial bore and a slotted end whose slots intersect said bore, the slotted end of said second driven shaft being disposed in said member, said member having an inlet port.

8. A machine for making holes in metal, said machine comprising a hollow open-ended bit, a movable holder for the bit, means associated with the holder for rotating the bit, means guiding the holder during its movement, means for moving the holder, and means operatively connected to the bit for heating the latter, said holder including a gas-tight enclosing housing having upper and lower walls and a pair of coaxial shafts including adjacent ends extending through the upper and lower walls and into the housing, the adjacent ends of said shafts being engaged one within the other, abutments on said adjacent ends and located within the housing, and a spring embracing said adjacent ends and biased between said abutments to yieldingly connect said shafts, one of the shafts being connected to said bit rotating means and the other of said shafts being tubular and having openings in its end positioned in the housing and having said bit attached at the other end of said shaft, and a conduit attached to said housing for supplying a gas to the housing, whereby gas may be supplied through the hollow shaft and bit.

ROY A. BRASWELL.

REFERENCES CITED

The following references are of record in the file of this patent:

UNITED STATES PATENTS

| Number | Name | Date |
| --- | --- | --- |
| 866,866 | Jottrand | Sept. 24, 1907 |
| 884,762 | Risting et al. | Apr. 14, 1908 |
| 1,554,407 | Coberly | Sept. 22, 1925 |
| 1,752,690 | Ost | Apr. 1, 1930 |
| 2,385,665 | Warwick | Sept. 25, 1945 |
| 2,436,251 | Dobie et al. | Feb. 17, 1948 |
| 2,485,361 | Condit et al. | Oct. 18, 1949 |